(12) United States Patent
Muster et al.

(10) Patent No.: US 10,518,377 B2
(45) Date of Patent: Dec. 31, 2019

(54) METHOD FOR PRODUCING A CAMSHAFT ASSEMBLY

(71) Applicant: ThyssenKrupp Presta TecCenter AG, Eschen (LI)

(72) Inventors: Manfred Muster, Ludesch (AT); Marko Curlic, Nendeln (LI); Aaron Pfitscher, Ludesch (AT); Peter Wiesner, Mauren (LI); Nicolas Hollweque, Diepoldsau (CH); Jörg Schätzle, Wangen (DE); Martial Danthois, Balzers (LI); Raphael Höber, Thüringen (AT)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 351 days.

(21) Appl. No.: 15/310,370

(22) PCT Filed: May 11, 2015

(86) PCT No.: PCT/EP2015/060273
§ 371 (c)(1),
(2) Date: Nov. 10, 2016

(87) PCT Pub. No.: WO2015/173158
PCT Pub. Date: Nov. 19, 2015

(65) Prior Publication Data
US 2017/0157729 A1    Jun. 8, 2017

(30) Foreign Application Priority Data

May 16, 2014 (DE) .................. 10 2014 106 924

(51) Int. Cl.
*B24B 19/12* (2006.01)
*B23P 11/00* (2006.01)
(Continued)

(52) U.S. Cl.
CPC .............. *B24B 19/12* (2013.01); *B23P 11/00* (2013.01); *F01L 1/047* (2013.01); *F01L 1/34* (2013.01);
(Continued)

(58) Field of Classification Search
CPC ......... B24B 19/12; B24B 5/01; F16H 53/025; F16D 1/06; F16D 1/072; F01L 1/34;
(Continued)

(56) References Cited

U.S. PATENT DOCUMENTS 6,295,893 B1 * 10/2001 Ogawa ................. B21D 53/845
123/90.6
7,721,432 B2 * 5/2010 Burgler ..................... B23P 9/02
198/346.3

(Continued)

FOREIGN PATENT DOCUMENTS

CN    85101567 A    10/1986
CN    87104854 A    1/1988
(Continued)

OTHER PUBLICATIONS

Int'l Search Report for PCT/EP2015/060273 dated Jun. 12, 2015 (dated Jun. 19, 2015).
(Continued)

*Primary Examiner* — Jacob J Cigna
*Assistant Examiner* — Lee A Holly
(74) *Attorney, Agent, or Firm* — thyssenkrupp North America, Inc.

(57) ABSTRACT

A method for producing a ready-for-use camshaft for controlling valves of an internal combustion engine may be directed towards camshafts that include a carrier shaft on which an end component, for example, a drive wheel, a phase adjuster, or a part of a phase adjuster, is arranged and cam elements that are attached in a positionally fixed (Continued)

manner to the carrier shaft. In some examples, the method comprises providing a carrier shaft and an end component, joining the end component to the carrier shaft, grinding at least the carrier shaft to form cam seats so as to establish readiness for use, introducing a surface profile into a first cam seat, providing a cam element with ready-for-use characteristics, seating the cam element on the cam seat with the surface profile, and repeating certain steps for additional cam elements.

14 Claims, 5 Drawing Sheets

(51) Int. Cl.
*F01L 1/047* (2006.01)
*F16D 1/06* (2006.01)
*F16H 53/02* (2006.01)
*F01L 1/34* (2006.01)

(52) U.S. Cl.
CPC ............ *F16D 1/06* (2013.01); *F16H 53/025* (2013.01); *B23P 2700/02* (2013.01); *F01L 2103/00* (2013.01)

(58) Field of Classification Search
CPC ............. F01L 1/047; F01L 2001/0472; F01L 2103/00; B23P 11/00; B23P 2700/02; B23P 6/00; B23P 9/02; B21D 53/845
See application file for complete search history.

(56) References Cited

U.S. PATENT DOCUMENTS

| | | | |
|---|---|---|---|
| 2004/0000213 A1* | 1/2004 | Hamamoto | F01L 1/047 74/567 |
| 2007/0180694 A1 | 8/2007 | Burgler | |
| 2009/0151141 A1* | 6/2009 | Moss | B23P 6/00 29/402.01 |
| 2010/0224146 A1 | 9/2010 | Kuwahara | |
| 2011/0197835 A1* | 8/2011 | Boegershausen | F01L 1/344 123/90.15 |
| 2012/0258648 A1* | 10/2012 | Stroppel | B24B 5/01 451/5 |
| 2012/0279467 A1* | 11/2012 | Scherzinger | B23P 11/00 123/90.17 |

FOREIGN PATENT DOCUMENTS

| | | |
|---|---|---|
| CN | 87106724 A | 4/1988 |
| CN | 1433871 A | 8/2003 |
| CN | 101468435 A | 7/2009 |
| CN | 102883854 A | 1/2013 |
| CN | 103406758 A | 11/2013 |
| DE | 32 27 693 A1 | 1/1984 |
| DE | 8301749 A1 | 8/1984 |
| DE | 3717190 A1 | 12/1988 |
| DE | 19710847 A1 | 9/1998 |
| DE | 102011005408 A1 | 9/2012 |
| DE | 102012109689 A1 | 4/2014 |
| EP | 0856642 A1 | 8/1998 |
| JP | H08105307 A | 4/1996 |
| JP | 8-144715 A | 6/1996 |
| JP | H08270409 A | 10/1996 |
| JP | H0989077 A | 3/1997 |
| JP | 2002-257149 A | 9/2002 |
| JP | 2012-213817 A | 11/2012 |
| JP | 2014-48471 A | 3/2014 |
| JP | 2014084871 A | 5/2014 |
| WO | 88/00643 A1 | 1/1988 |
| WO | 03/027446 A1 | 4/2003 |
| WO | 2004079163 A1 | 9/2004 |
| WO | 2007/012408 A1 | 2/2007 |
| WO | 2012/031770 A1 | 3/2012 |
| WO | 2013/156564 A | 10/2013 |

OTHER PUBLICATIONS

English language Abstract for DE 32 27 693 A1 listed above.
English language Abstract for DE 10 2011 005 408 A1 listed above.
English language Abstract for CN 85101567 A listed above.
English language Abstract for CN 87106724 A listed above.
English language Abstract for CN 1433871 A listed above.
English language Abstract for CN 101468435 A listed above.
English language Abstract for CN 102883854 A listed above.
English language Abstract for DE 10 2012 109 689 A1 listed above.

* cited by examiner

METHOD FOR PRODUCING A CAMSHAFT ASSEMBLY

CROSS REFERENCE TO RELATED APPLICATIONS

This application is a U.S. National Stage Entry of International Patent Application Serial Number PCT/EP2015/060273, filed May 11, 2015, which claims priority to German Patent Application No. DE 10 2014 106 924.2 filed May 16, 2014, the entire contents of both of which are incorporated herein by reference.

FIELD

The present disclosure relates to methods for producing ready-for-use camshafts for controlling valves of an internal combustion engine.

BACKGROUND

A method for producing a ready-for-use camshaft is known for example from WO 2012/031770 A1, wherein, for the joining of cam elements to the carrier shaft, cooling of the carrier shaft and heating of the cam elements is performed in order to enable the carrier shaft to be pushed through the bores of the camshaft. The carrier shaft should subsequently be heated again, and the cam elements are cooled again. As a result, the cam elements are secured on the carrier shaft with an interference fit, which arises as a result of the thermal changes in shape. The heating and subsequent cooling is however disadvantageous, and requires a high level of outlay in terms of tooling, and is implemented in particular if a continuous, non-openable bearing channel is provided for example in a camshaft module for arrangement on the cylinder head of an internal combustion engine, through which bearing channel the carrier shaft must be pushed. Often, a further machining step is necessary in order to align the cam elements on the carrier shaft, which further machining step must likewise be avoided.

DE 3717190 A1 presents a basic principle of a method for mounting cam elements on prepared cam seats that are formed on the outer surface of a carrier shaft. The cam seats form sections which comprise an increased diameter in relation to those sections of the carrier shaft which do not form the cam seats. Here, it is proposed that the cam elements be pushed onto the cam seats with plastic deformation occurring in the hub connection. The cam seats are in this case produced by way of a roller-burnishing process or a rolling process, and may for example form an encircling channel structure. The widened regions for forming the cam seats should be produced using a mandrel tool, with which only a low level of accuracy is possible. To produce a ready-for-use camshaft, the cam elements, which are produced from a sintered material, must subsequently undergo finish machining, for example by way of a grinding and/or polishing process.

Often, camshafts comprise end components, for example in the form of a drive wheel for a traction mechanism, that is to say for example a sprocket, a belt pulley or an attachment flange for a belt pulley. The end component may be fastened to the carrier shaft and may for example also form a phase adjuster or at least a part of a phase adjuster. Such end components must be aligned accurately relative to the carrier shaft, and it is often the case that multiple cutting machining steps in different chucking setups are necessary in order to provide the end component and the carrier shaft such that these are in particular free from position errors and concentricity errors with respect to one another.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element. Similarly, it should be understood that the steps of any method claims need not necessarily be performed in the order in which they are recited, unless the context of the claims requires otherwise.

The present disclosure generally concerns methods for producing a ready-for-use camshaft for controlling valves of an internal combustion engine, which in some examples has a carrier shaft on which an end component, for example, a drive wheel, a phase adjuster, or a part of a phase adjuster, is arranged, in addition to multiple cam elements that are attached in a positionally fixed manner to the carrier shaft.

It is an object of the invention to refine a method for producing a ready-for-use camshaft which does not involve thermal joining steps, and it is sought for the provision of a ready-for-use camshaft to be possible easily with the fewest possible steps.

To achieve the object, the method according to the present invention comprises at least the following steps:

a) providing the carrier shaft and the end component,
b) joining the end component to the carrier shaft,
c) grinding at least the carrier shaft to form cam seats so as to establish readiness for use,
d) introducing a surface profile into a first cam seat,
e) providing a cam element with ready-for-use characteristics, f) seating the cam element on the cam seat provided with the surface profile, and g) repeating steps d) to f) with a frequency corresponding to a required number of cam elements.

By the use of the method according to the invention, it is possible in a simple manner to produce a ready-for-use camshaft which does not involve thermal joining methods. In particular, it is possible for cam elements to be provided which have already undergone finish machining. By virtue of at least the carrier shaft, but also of the end component, being ground so as to establish readiness for use, the advantage can be achieved, for example, that bearing points on the carrier shaft are also machined already by way of the grinding machining, such that the camshaft produced by way of steps d) to f), with a corresponding number of cam elements, does not need to be supplied for any further machining. After the final cam element has been mounted onto the final cam seat, the camshaft can be provided ready for use, for example for installation into a cylinder head or into a cover module. Not mentioned is the fitting of spacer elements, bearing rings and the like, which may be provided along with the cam elements by way of steps d) to f).

In particular, step c) is suitable for the machining, in particular grinding machining, of the end component so as to establish readiness for use. By virtue of the fact that the end component has been joined to the carrier shaft before the grinding for establishing readiness for use, it is possible for the carrier shaft and at the same time also the end component, in an assembled state, to undergo finish machining by way of a grinding machining process so as to establish readiness for use in one chucking setup, for example in one grinding installation.

The grinding of the carrier shaft may encompass machining of the cam seats and finish machining of bearing points which are formed on the carrier shaft and which are formed between or adjacent to the cam seats. In particular, the grinding of the carrier shaft, and in particular of the end component, so as to establish readiness for use may be performed on a grinding installation, wherein subsequently, the assembly composed of the ground carrier shaft and of the end component can be transferred into a cam seating installation, and at least the introduction of the surface profile and the seating of the cam element can be performed by means of the cam seating installation. The introduction of the surface profile may be performed for example by way of a roller-burnishing tool. By virtue of the fact that the cam seats have been prepared by way of a grinding machining process, it is possible, by way of correspondingly accurate production of the surface profile, for seating of the cam elements to be performed with such accuracy that no further finish machining has to be performed, for example by way of a final grinding and/or polishing step. By way of the grinding machining of the cam seats and the targeted production of a surface profile by way of a roller-burnishing tool, it is consequently possible for cam elements to be provided which have already undergone finish machining.

For the introduction of the surface profile and for the seating of the cam element on a cam seating installation, the end component may be clamped in the cam seating installation, and it may be provided that the carrier shaft is clamped, on a side situated opposite the end component, by way of a tailstock.

The cam elements may, for the provision and the seating on the cam seats provided with the surface profile, be guided over the tailstock and thereby easily threaded onto the carrier shaft, such that the tailstock can remain arranged on the carrier shaft during the joining process for all of the cam elements. In this way, the process of the seating of the cam elements on the cam seats is greatly simplified. For this purpose, the tailstock may comprise a diameter smaller than the bores in the cam elements.

By virtue of the fact that a cam seat undergoes surface machining before each seating process of a cam element, the advantage is achieved that the cam elements can be guided without force, and in particular without contact, over the preceding cam seats. The introduction of the surface profile is in this case performed at a first cam seat which for example faces toward the end component on the carrier shaft. The cam element can be threaded onto the carrier shaft over the free end of the carrier shaft on which the tailstock is mounted, without the cam element having to be pushed over the non-surface-machined cam seats. Only before the mounting of the cam element onto the associated cam seat does the roller-burnishing tool act on the cam seat and generate the surface profile, such that the cam element can be mounted in retentive fashion on, and in particular pressed onto, the cam seat with the surface profile.

The particular advantage of the method according to the invention lies in the fact that, for the provision of the cam elements with ready-for-use characteristics, the cam elements, before being seated on the carrier shaft, can be ground to their final dimensions and/or subjected to surface machining and in particular may comprise a rotational orientation which corresponds to the later orientation on the carrier shaft. Only in very rare cases, it may be necessary here, if the repeat accuracy of the roller-burnishing diameter is not sufficient, for use to be made of an electromechanical axle or a calibration tool. It was however basically possible to establish that, by way of the method according to the invention, after the mounting of the cam elements, the camshaft exhibited adequate accuracy for use. In particular if no thermal joining methods are used, which can result in distortion or a modification of surfaces, components may be provided that have already undergone finish machining and possibly also coating. Similarly to the cam elements, it is also possible for further elements that are to be applied to the carrier shaft to undergo surface finish machining and/or coating, such as for example bearing rings.

By the use of relatively new technologies, it is possible for fully ground cam elements to be mounted onto the carrier shaft, and in this way it is possible for all process steps relating to the cam elements to be performed before the assembly process. In this context, the cam elements may be not only ground but for example also already coated before being pressed onto the carrier shaft. In the case of such a method, the cam elements are for example ground, and if required subjected to finish machining, for example by way of a coating process, while situated adjacent to one another as a pack. It is subsequently possible for the cam elements to be coated as a pack, that is to say while situated adjacent to one another having been threaded for example onto a mandrel or some other carrier element, whereby only the raceway is coated, but not the side surfaces. After the coating, the cam elements may be provided directly for mounting onto the cam seats with the surface profiling.

The coating may for example comprise a DLC coating, which refers to a "Diamond-Like Carbon coating".

For example, during the grinding of the cam seats so as to establish readiness for use, insertion bevels may be provided so as to be integrally formed on said cam seats, whereby it is made easier for the cam elements to be pushed on over the cam seats without surface profiling.

Figure 1:
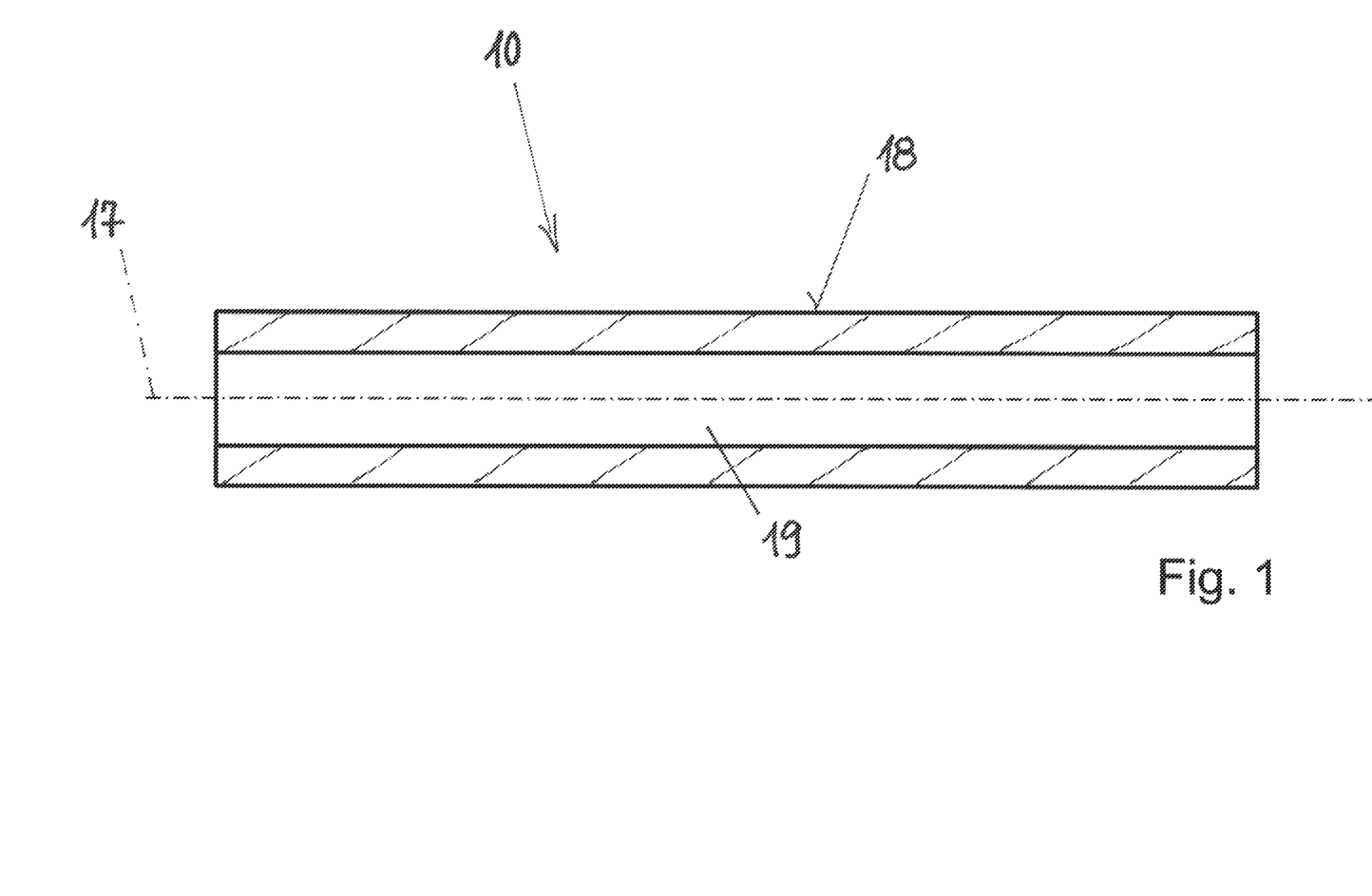
FIG. 1 is a cross-sectional view of an example carrier shaft with a non-ground surface.

FIG. 1 schematically shows a carrier shaft 10 with a non-ground surface 18, wherein the carrier shaft 10 is in the form of a hollow shaft and comprises a cavity 19 extending along the central axis 17. The carrier shaft 10 thus forms a weight-minimized tube which extends rotationally symmetrically about the central axis 17 and which may for example be cut to length from a bar of material.

Figure 2:
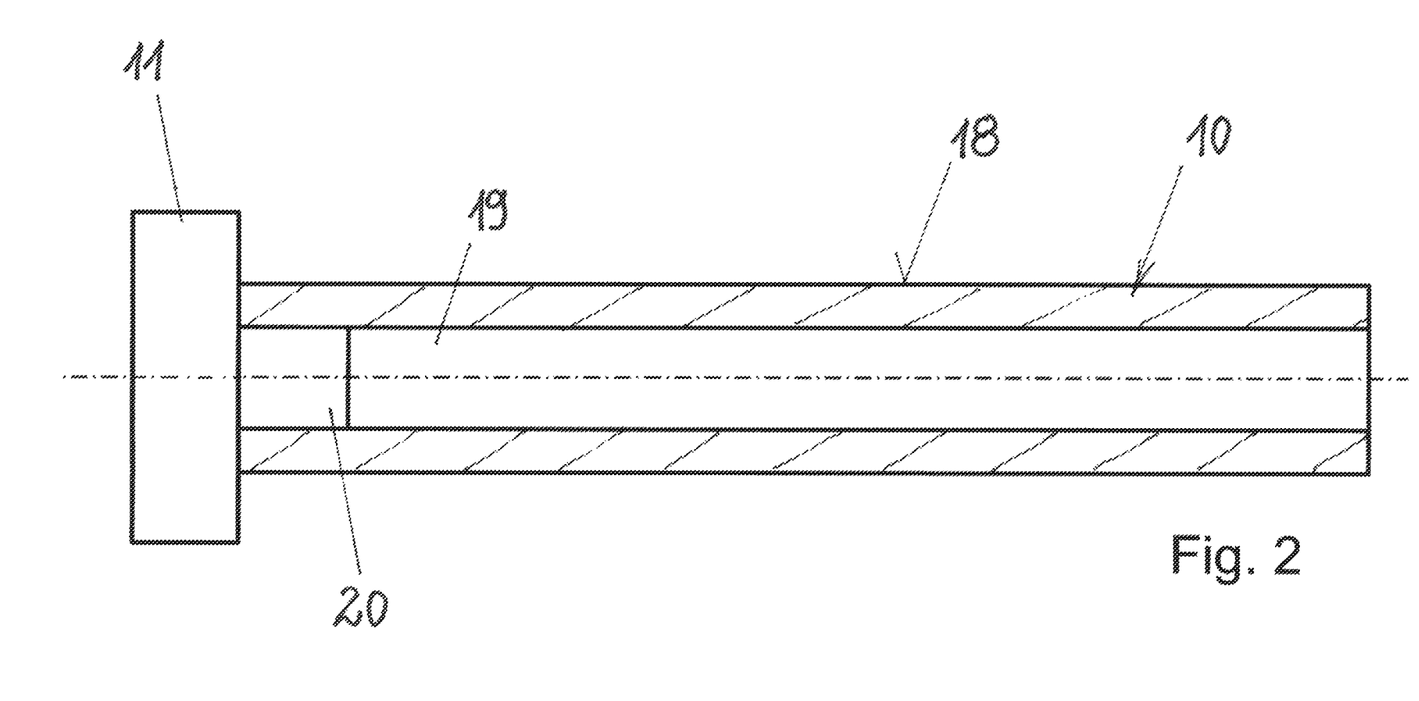
FIG. 2 is a cross-sectional view of the carrier shaft with the non-ground surface and with an end component arranged on an end side of the carrier shaft.

FIG. 2 illustrates an assembly composed of the carrier shaft 10 and of an end component 11, and the end component 11 may for example be a drive wheel, a phase adjuster or a part of a phase adjuster, and in the context of the present invention, the end component 11 is part of the ready-for-use camshaft. For the fastening of the end component 11, the latter comprises a projection 20 which is, by way of example, inserted into the cavity 19 in the carrier shaft 10, wherein the end component 11 may also be fastened to the carrier shaft 10 in some other way, for example by way of a cohesive joining process or by way of connecting elements. Here, the carrier shaft 10 comprises the non-ground surface 18, wherein the end component 11 may also comprise a non-ground, in particular untreated surface. For example, the end component 11 can be joined to the carrier shaft 10 in a simple manner without regard to position and dimensional tolerances because, as will be described below, grinding machining both of the carrier shaft 10 and of the end component 11 in an assembled state is performed in a common chucking setup.

Figure 3:
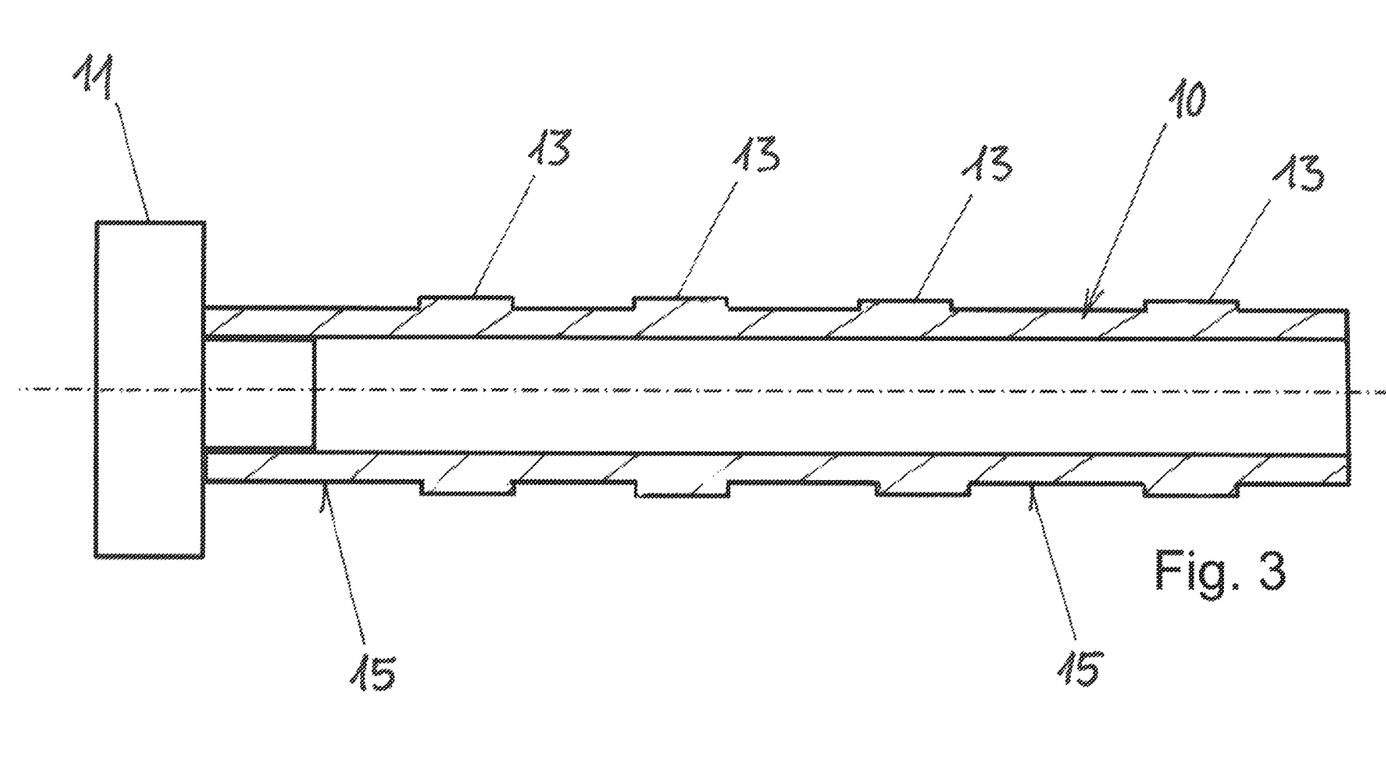
FIG. 3 is a cross-sectional view of an example assembly comprised of an example carrier shaft and an example end component in a state in which it has been ground so as to establish readiness for use, with example cam seats having been formed on the carrier shaft.

FIG. 3 shows the assembly composed of the carrier shaft 10 and of the end component 11 in a ground state. As a result of the grinding machining so as to yield a ready-for-use state of the carrier shaft 10 and of the end component 11, a sequence of cam seats 13 is shown on the outer side of the carrier shaft 10. By way of example, two bearing points 15 are also shown, and the bearing points 15 comprise a smaller diameter than the diameters of the cam seats 13. In a manner not shown in any more detail, it is also possible for the end component 11 to undergo cutting machining, and the end component 11 forms, for example, a drive wheel, a sensor disk, a part of a phase adjuster or the like.

Figure 4:
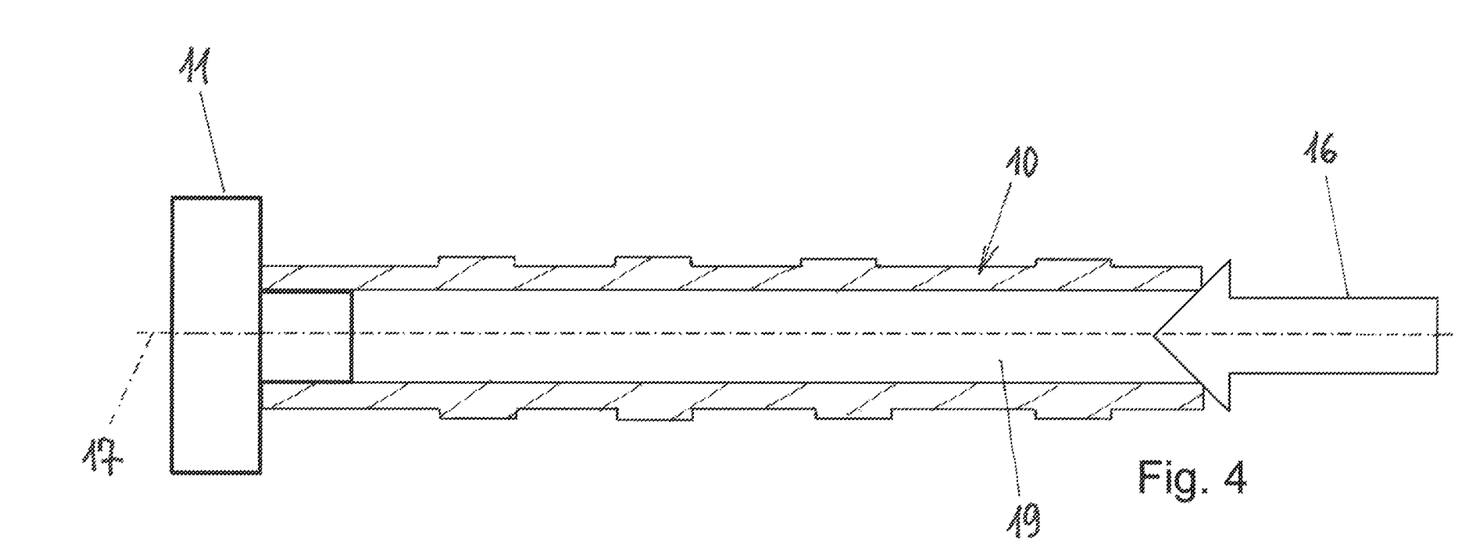
FIG. 4 is a cross-sectional view of the assembly of the carrier shaft with the end component, wherein the end component is clamped in an example cam seating installation and the carrier tube is held by way of an example tailstock on the opposite side in relation to the end component.

FIG. 4 shows, in a refinement of the assembly composed of the carrier shaft 10 and of the end component 11 as per FIG. 3, the assembly in a chucking setup on a cam seating installation, wherein, in a manner not shown in any more detail, the end component 11 may be clamped and, on the opposite side in relation to the end component 11, the carrier shaft 10 is held on a tailstock 16. The tailstock 16 is for example inserted into the cavity 19 at the end side. In this chucking setup, the assembly composed of the carrier shaft 10 and the end component 11 can be set in rotation about the central axis 17.

Figure 5:
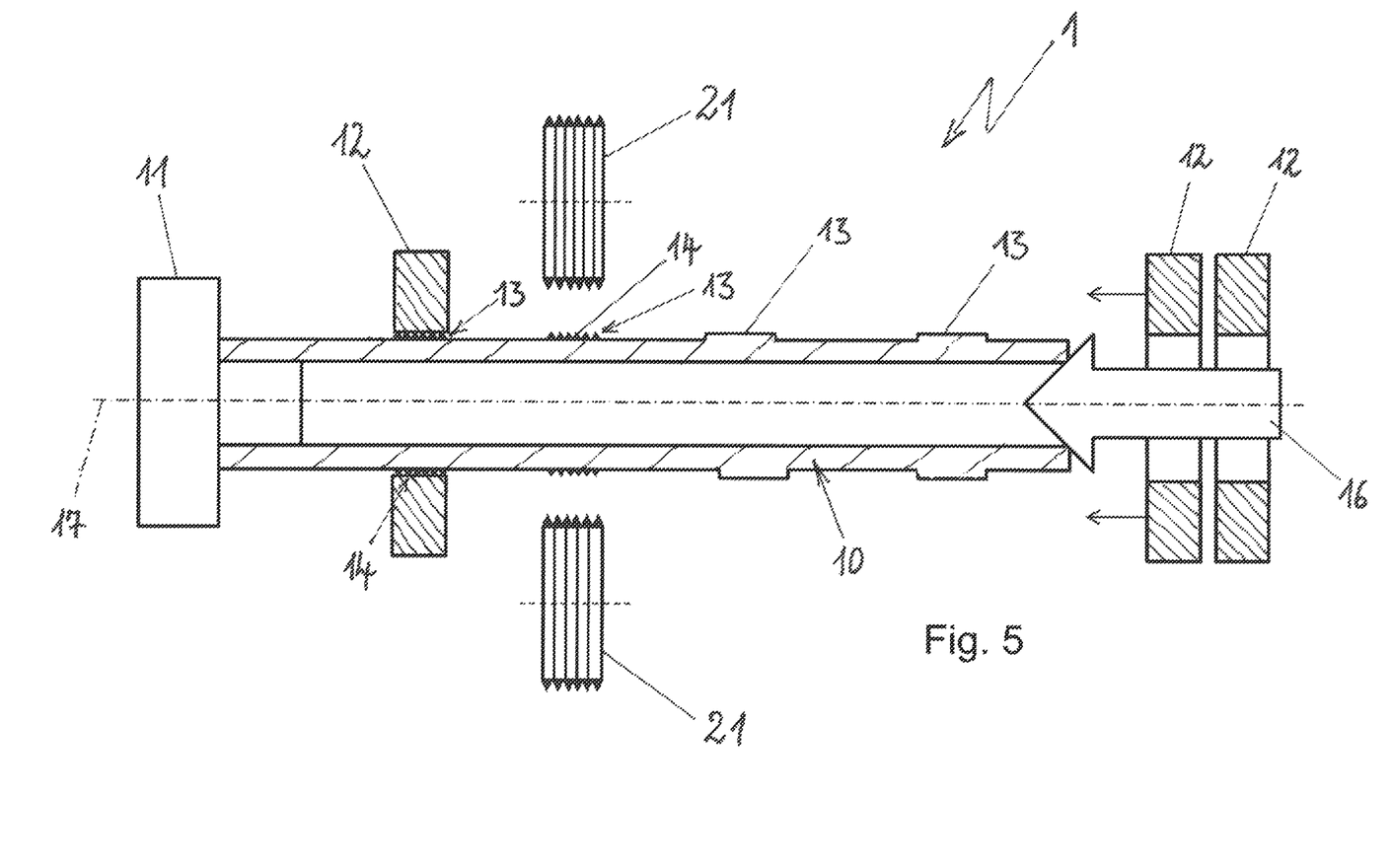
FIG. 5 is a schematic view of an example carrier shaft with an example end component with example cam elements being mounted onto the carrier shaft, wherein a surface profile is being introduced into the cam seats, for which purpose an example roller-burnishing tool is schematically shown.

Finally, FIG. 5 shows the assembly composed of the carrier shaft 10 and the end component 11, and a first cam seat 13 has already been machined by way of a schematically illustrated roller-burnishing tool 21 and equipped with a cam element 12, wherein the cam seat 13 on the left-hand side adjacent to the end component 11 comprises a surface profile 14. The roller-burnishing tool 21 is shown, by way of example, with a channel structure which is reproduced on the cam seat 13 by virtue of the roller-burnishing tool 21, shown by way of example in a twofold arrangement, being pressed onto the cam seat 13 while the carrier shaft 10 is set in rotation about the central axis 17. The roller-burnishing tool 21 is shown by way of example on the second cam seat 13, which already likewise comprises a surface profile 14.

A cam element 12 is shown as having been mounted onto the first cam seat 13, and further cam elements 12 are shown by way of example over the tailstock 16 and are provided there. When the surface profile 14 has been introduced into the next cam seat 13 by way of the roller-burnishing tool 21, a further cam element 12 can be mounted onto the corresponding seat 13.

Here, the cam elements 12 may have already undergone finish machining, and for example been coated, so as to establish readiness for use.

In the sequence of FIGS. 1 to 5, the method for producing a ready-for-use camshaft 1 can be described as follows on the basis of the exemplary embodiment shown.

In the method step a), the carrier shaft 10 as per FIG. 1 is provided, and in the further method step b), the end component 11 may be joined to the carrier shaft 10 as shown in FIG. 2.

In the further method step c), grinding at least of the carrier shaft 10 so as to establish readiness for use may be performed, such that cam seats 13 as per FIG. 3 are formed. Here, during the grinding for establishing readiness for use, not only the carrier shaft 11 but also the end component 11 may undergo grinding machining. Here, the grinding for establishing readiness for use also encompasses the formation of bearing points 15 so as to establish readiness for use.

In FIG. 4, the assembly composed of the carrier shaft 10 and the end component 11 is transferred from a grinding installation (FIG. 3) to a cam seating installation (FIGS. 4 and 5). Here, FIG. 4 illustrates a tailstock 16 which serves for the chucking setup as part of the cam seating installation, and, in a manner not illustrated in any more detail, the end component 11 can be clamped so as to realize a defined chucking setup of the assembly composed of the carrier shaft 10 and end component 11.

In the further method steps d), e), f) and g), it is possible, as shown in FIG. 5, for the introduction of a surface profile 14 to firstly be performed by way of a roller-burnishing tool 21, wherein the surface profile 14 is applied to the cam seats 13 prepared by way of a grinding machining process. Subsequently, a cam element 12 with ready-for-use characteristics is provided, as shown in the region of the tailstock 16, and the cam elements 12 can be guided over the carrier shaft 10 along the arrow direction, and seating of the cam elements 12 onto the cam seats 13 provided with a surface profile 14 can be performed as per method step f).

As per method step g), the steps d) to f) may be repeated until a corresponding number of cam elements 12 has been mounted on the carrier shaft 10, and it is for example possible for the mounting to be performed a total of four times, as shown in the exemplary embodiment, because four cam seats 13 are provided.

The invention is not restricted in terms of its embodiment to the preferred exemplary embodiment specified above. Rather, a number of variants are conceivable which make use of the presented solution even in the case of fundamentally different embodiments. All of the features and/or advantages that emerge from the claims, from the description or from the drawings, including structural details and spatial arrangements, may be essential to the invention both individually and in a wide variety of combinations.

What is claimed is:

1. A method for producing a ready-for-use camshaft for controlling valves of an internal combustion engine, the method comprising:
   joining an end component to a carrier shaft;
   grinding the carrier shaft to form cam seats so as to establish readiness for use, wherein the cam seats are configured to permit passage of cam elements thereover without fixing thereof;

introducing a surface profile into a first cam seat after said grinding step, the first cam seat adjacent the end component;

seating, by pressing, a first cam element with ready-for-use characteristics on the first cam seat with the surface profile such that the first cam element is attached in a positionally fixed manner to the carrier shaft;

repeating the introducing and seating steps for a second cam seat and a second cam element, wherein the second cam seat is axially farther away from the end component relative to the first cam seat, clamping the end component by way of a tailstock positioned at a side of the carrier shaft opposite the end component for the introducing the surface profile into the first cam seat and for the seating of the first cam element on the first cam seat, and guiding the first and second cam elements over the tailstock such that the tailstock remains positioned on the carrier shaft as the first and second cam elements are seated on the carrier shaft.

2. The method of claim 1 wherein the end component is a drive wheel, a phase adjuster, or a part of a phase adjuster.

3. The method of claim 1 wherein the grinding comprises machining of the end component so as to establish readiness for use.

4. The method of claim 1 wherein the grinding comprises grinding machining of the end component so as to establish readiness for use.

5. The method of claim 1 wherein the grinding comprises machining of the cam seats and finish machining of bearing points formed on the carrier shaft between or adjacent to the cam seats.

6. The method of claim 1 wherein the grinding of the carrier shaft to establish readiness for use is performed on a grinding installation, wherein at least the introducing the surface profile and the seating of the first cam element are performed on a cam seating installation.

7. The method of claim 1 further comprising:
at least one of
grinding the first and second cam elements, respectively, to final dimensions before seating the first and second cam elements on the carrier shaft, or
subjecting the first and second cam elements, respectively, to surface finish machining before seating the first and second cam elements on the carrier shaft; and
orienting the first and second cam elements rotationally so as to correspond, respectively, to orientations of the first and second cam seats on the carrier shaft before seating the first and second cam elements on the carrier shaft.

8. The method of claim 1 further comprising coating the first and second cam elements before seating the first and second cam elements on the carrier shaft.

9. The method of claim 1 further comprising grinding bores in the first and second cam elements that have diameters that are larger, respectively, than diameters of the first and second cam seats.

10. The method of claim 1 wherein a roller-burnishing tool is used to introduce the surface profile into the first cam seat.

11. A method for producing a ready-for-use camshaft for controlling valves of an internal combustion engine, the method comprising:

joining an end component to a carrier shaft;

grinding the carrier shaft to form a first cam seat, wherein the cam seat is configured to permit passage of cam elements thereover without engagement thereof;

introducing a surface profile into the first cam seat, wherein the first cam seat is adjacent the end component;

seating, by pressing, a first cam element on the first cam seat such that the first cam element is fixed to the carrier shaft, repeating the grinding, introducing, and seating steps for a second cam seat and a second cam element, wherein the second cam seat is axially farther away from the end component relative to the first cam seat;

clamping the end component by way of a tailstock positioned at a side of the carrier shaft opposite the end component for introducing the surface profile into the first cam seat and for seating the first cam element on the first cam seat, and guiding the first cam element and the second cam element over the tailstock such that the tailstock remains positioned on the carrier shaft as the first and second cam elements are seated on the carrier shaft.

12. The method of claim 11 wherein the grinding comprises machining the first cam seat and finish machining bearing points formed on the carrier shaft between the first cam seat and a second cam seat or adjacent to the first cam seat.

13. The method of claim 11 wherein the grinding of the carrier shaft is performed on a grinding installation, wherein at least the introducing the surface profile and the seating of the first cam element are performed on a cam seating installation.

14. The method of claim 11 further comprising coating the first cam element before seating the first cam element on the carrier shaft.

* * * * *